United States Patent
Malasky, IV et al.

(10) Patent No.: US 7,524,104 B2
(45) Date of Patent: Apr. 28, 2009

(54) METHOD OF MIXING UTILIZING A TURNTABLE

(75) Inventors: Joseph J. Malasky, IV, Arden, NC (US); Edward L. Peart, Arden, NC (US); Cedric S. Reynolds, Greensboro, NC (US); Edward C. Prather, Hendersonville, NC (US)

(73) Assignee: Stovall Life Science, Inc., Greensboro, NC (US)

( * ) Notice: Subject to any disclaimer, the term of this patent is extended or adjusted under 35 U.S.C. 154(b) by 0 days.

(21) Appl. No.: 11/904,784

(22) Filed: Sep. 28, 2007

(65) Prior Publication Data
US 2008/0080305 A1    Apr. 3, 2008

Related U.S. Application Data

(63) Continuation of application No. 11/013,875, filed on Dec. 16, 2004, now Pat. No. 7,296,923.

(51) Int. Cl.
*B01F 9/10* (2006.01)
(52) U.S. Cl. .................. 366/208; 366/209; 366/213
(58) Field of Classification Search ............ 366/208, 366/209, 213, 214
See application file for complete search history.

(56) References Cited

U.S. PATENT DOCUMENTS

| | | | | |
|---|---|---|---|---|
| 3,607,478 A | * | 9/1971 | Henninges et al. | 438/747 |
| 4,673,297 A | * | 6/1987 | Siczek et al. | 366/208 |
| 4,702,610 A | * | 10/1987 | Reynolds, Jr. | 366/213 |
| 5,921,676 A | * | 7/1999 | Reynolds et al. | 366/208 |

* cited by examiner

*Primary Examiner*—David L Sorkin

(57) ABSTRACT

An undulating mixing device for precise, controlled agitation of sensitive biological and chemical solutions provides a base and a platform connected by four flexible connectors, a spring loaded motor mount assembly pivotally attaching a motor to the base, a turntable rotatably attached to the base, a tilt assembly pivotally and rotationally attached to the turntable and rigidly affixed to the platform, and a motor shaft that engages a groove on the turntable for causing rotation thereof. The tilt assembly includes an adjustable collar which controls the tilt or yaw movement of the platform as the motor effects rotation of the turntable. A selectively adjustable speed control switch sets the desired rotational speed of the motor via a microprocessor. The device functions without modification on a plurality of selected voltages and frequencies for achieving the desired rotational speed.

11 Claims, 13 Drawing Sheets

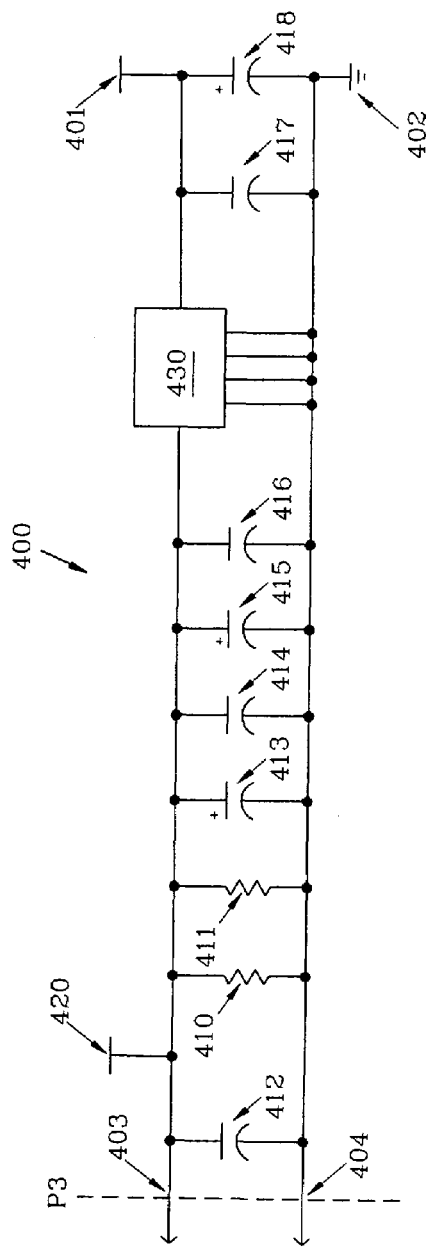
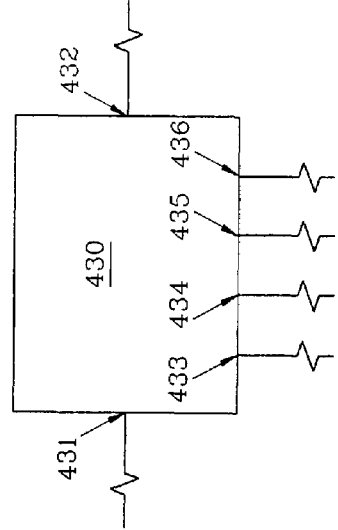
FIG. 7
FIG. 7a

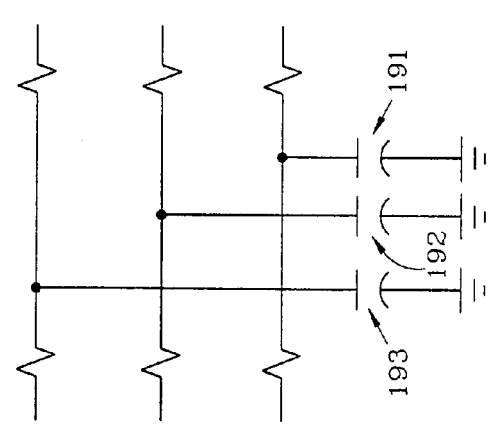
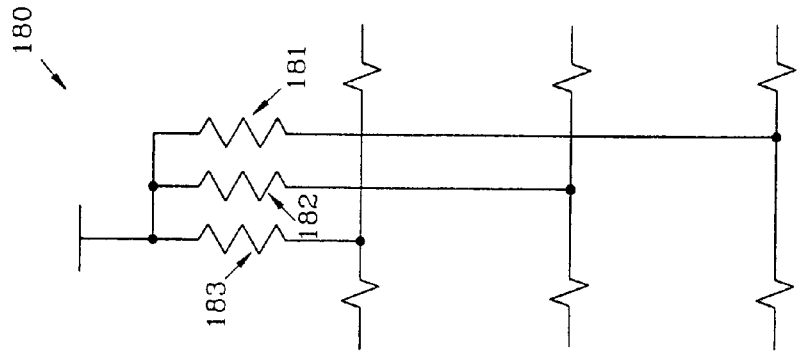
FIG. 8f
FIG. 8g
FIG. 8h

METHOD OF MIXING UTILIZING A TURNTABLE

This is a continuation of and claims benefits under prior application Ser. No. 11/013,875 filed 16 Dec. 2004, now U.S. Pat. No. 7,296,923.

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

In compliance with 37 C.F.R. §1.52(e), a computer program listing appendix incorporating features of the present invention is submitted herewith on compact disc and is incorporated by reference in its entirety herein. The computer program listing appendix is submitted on a first compact disc labeled "Copy 1" and on a second compact disc labeled "Copy 2". Each disc was created 28 Oct. 2004 in an IBM-PC machine format and MS-Windows operating system compatibility with the disc labeled Copy 2 being an identical copy of the disc labeled Copy 1. Each compact disc contains a single file entitled "BLDC.ASM" which is the source code of a computer program that may be used with the present invention. The BLDC.ASM file having a size of 28,363 bytes was created on 13 May 2003.

FIELD OF THE INVENTION

The invention herein pertains to an undulating mixing device and a method for agitating various solutions in a laboratory environment.

DESCRIPTION OF THE PRIOR ART AND OBJECTIVES OF THE INVENTION

Lab technicians frequently have to agitate, stir or blend very delicate solutions in a smooth fashion without the introduction of bubbles or froth where vigorous agitation may ruin the samples, such as during protein, DNA and RNA staining operations and processes.

In recent years, several devices have been promoted which gently agitate solutions for use in laboratory environments and automate tedious procedures. U.S. Pat. Nos. 4,702,610; 4,893,938; and 5,423,603, are examples of devices that utilize a gentle vertical agitation for solutions having components with different specific gravities in order to prevent layers from forming which may inhibit the completion of a desired chemical reaction. A mixing device having a small footprint, a selectively tiltable platform, and manual speed control, such as in U.S. Pat. No. 5,921,676, addresses the two main problems including (1) a relatively large footprint that limits the number of devices that may fit in controlled laboratory environments, such as in an incubator or a refrigerated unit, and (2) a predetermined degree of tilt between the platform and the base that remains fixed during agitation which may be too pronounced or too little for specific mixing requirements.

Not addressed by these prior devices is the increased possibility of contamination of very delicate solutions from the mechanical operation such as dust and arcing created by a brush motor along with undesired vibration and noise. Such contamination may lead to undesired results or inadvertent reactions with the delicate solution.

Additional problems associated with prior mixing devices involve speed control. First, prior devices utilizing mechanical gears to effect adjustment to the mixing rate are more likely to introduce undesired contaminants and vibration, but are limited to pre-set gear ratios with a speed control. The problems associated with pre-set speed adjustments is they usually do not compensate for the possible varying mass and inertia generated by different load sizes, shapes and placements. Accordingly, the agitation rates of subsequent loads set to the same speed may differ from that of a prior load despite having the same speed control setting. The different actual agitation rates may cause undesired results and variations of the sample solutions.

Thus, with the above concerns in mind, it is an objective of the present invention to provide a laboratory mixing device with an electronically commutated brushless motor to prevent arcing, possible contamination, and vibration associated with a non-brushless motor.

It is another objective of the present invention to provide a laboratory mixing device that monitors and adjusts the actual motor rotational speed to a speed desired by the user.

It is yet another objective of the present invention to provide a laboratory mixing device that effects rotation of a turntable via a friction ring within a groove on the turntable for smooth, positive movement.

It is a further objective of the present invention to provide a laboratory mixing device that will automatically adjust the input voltages to accommodate domestic 120 VAC and foreign 250 VAC environments at 60 Hz and 50 Hz without circuitry reconfiguration.

It is still a further objective of the present invention to provide a laboratory mixing device which is compact, durable and can be cost effective to produce and operate.

It is another objective of the present invention to provide a laboratory mixing device that has low heat contribution to special environments such as incubators and refrigerators.

Various other objectives and advantages of the present invention will become apparent to those skilled in the art as a more detailed description is set forth below.

SUMMARY OF THE INVENTION

The aforesaid and other objectives are realized by providing a mixing device and method for precise, selectively controlled agitation of sensitive biological and chemical solutions in a laboratory environment through electronic commutation of a brushless DC motor.

The preferred mixing device includes a drive mechanism attached to a base. The drive mechanism includes a brushless DC motor with a vertical motor shaft having a friction ring affixed in a groove thereon, a motor mount assembly for pivotally attaching the motor to the base, a turntable with a central shaft rotationally attached to the base and rotated by the motor shaft engaging, a platform, a tilt assembly pivotally attached to the turntable that is rotatable thereunder and rigidly affixed to the platform thereabove, electrical circuitry including a pair of circuit boards with a microprocessor in electrical communication with the motor for managing the power supplied thereto and the speed thereof, and a potentiometer serving as a manually adjustable incremental speed control switch through rotation of its shaft. The base is connected to the platform by a plurality of flexible connectors and the tilt assembly. Selective electronic activation of the drive mechanism induces rotation of the turntable which carries the tilt assembly about the turntable shaft and while the fluctuating compressive and tensile forces on the flexible connectors allow the platform to tilt or yaw during rotation as the tilt assembly pivots back and forth above the turntable.

While the base includes a planar portion and a housing, the platform is preferably a rigid material in a generally planar shape. A commercially available rubberized non-slip pad can be placed on top of the platform to increase frictional engagement therewith and to prevent the sliding of beakers, dishes, or other containers. While an X-shape is preferred for the housing, other shapes that form corners allowing the flexible connectors to attach thereon to the planar base portion are also contemplated. The flexible connectors are preferably a flexible polyvinyl chloride tubing although other standard flexible connectors of either polymeric, natural or other spring materials are contemplated. The turntable is preferably a rigid disk that defines a circular groove with an outer wall and an oval pivot channel and is driven by a motor shaft.

The pair of circuit boards are affixed to the planar base portion and comprise a power control circuit board for converting and regulating the power supply that is in electrical communication with a motor control circuit board for managing the speed of the motor. Functions of these circuit boards may be combined into one board or further distributed to additional boards. The mixing device can accommodate both domestic 120 VAC and foreign 250 VAC at 60 Hz and 50 Hz without modification and remains in a powered "on" state when in electrical communication with an adequate power source.

The motor mount assembly includes an arm that is rigidly attached to the motor, a shaft that is rotationally attached to the planar base portion, and a spring which links the arm to the planar base portion whereby pivoting the arm inwardly stretches the spring and moves the attached motor arcuately above and across the planar base portion. Pivoting the motor mount arm inward allows the turntable groove to receive the motor shaft while the recoil forces of the stretched spring maintain contact between the friction ring and the turntable groove outer wall.

The tilt assembly is a multi-component unit which includes a pivot shaft having a pivot slot that receives a connecting rod that is affixed to the turntable, a collar, a ball bearing that is pressure fitted on the pivot shaft and is rigidly attached to the collar which allows the collar to rotate freely about the pivot shaft, a threaded post that is surrounded by the collar, and an internal spring which rests on the floor of the collar and abuts the interior surface of the threaded post to prevent any drift thereof during rotation. The tilt assembly is pivotable on the connecting rod affixed to the turntable in the turntable pivot channel. The threaded post is rigidly affixed to the center of the platform thereby the tilt assembly links the platform to the turntable such that selective manual clockwise or counter-clockwise rotation of the collar either raises or lowers the threaded post therein and thus changes the distance between the platform and the base whereby an increase in distance decreases the possible pitch and yaw of the platform and therefore allows for selective adjustment of the vertical agitation induced into the solution thereon during use of the mixing device.

The motor is controlled by a microprocessor on the motor control circuit board possessing pulse-width modulation ("PWM") module with application software-implemented functions that provides (1) a compensated feedback algorithm to effect precise speed control including compensation of the effects of mechanical inertia and loading, and (2) a virtual power switch that eliminates routing line voltage carrying conductors to a combination potentiometer-switch assembly which keeps voltage low. The microprocessor compares the input voltage received from the potentiometer, which is a digital representation of the angular position of its shaft and the selected speed of the motor, and the feedback voltage from the Hall-effect sensor array, which is a digital representation of the motor shaft speed as each sensor provides the instantaneous angular position of the motor shaft in relation to each phase of the stator windings, to a table of speed equivalent voltages pre-programmed in the microprocessor and determines the appropriate change in motor shaft speed direction and magnitude. The microprocessor implements a change in motor speed by sending output voltage to the motor through the PWM module which regulates the frequency and duration of the output voltage sent to the motor's phased stator windings for electronic commutation of the motor. In order to provide smooth and gradual speed transitions, the microprocessor directs stepped speed adjustments in the direction of the selected motor speed whereby the magnitude of each step is limited by a pre-programmed maximum increment or decrease in motor speed. The microprocessor continues to monitor instantaneous motor shaft speed and direct appropriate successive stepped gradual changes therein to achieve and maintain the selected speed.

The preferred method of mixing closely follows the function of the device described herein. To begin mixing with the device, the mixing device must first be in electrical communication with an electric power source though a standard electric power cord. Prior to connecting the device to a power source, the potentiometer shaft should be placed in a fully counter-clockwise position to prevent undesired movement of the platform and the desired range of vertical agitation should be set by selective manual counter-clockwise or clockwise rotation of the tilt assembly collar. Upon connection to the power source, the line operated switch-mode power supply circuit on the power control circuit board cleans the potentially poorly regulated and unstable plurality of electric currents and voltages supplied to the mixing device and converts the current into +12 VDC which is supplied to the motor control circuit board. The voltage sub-regulator circuit contained on the motor control circuit board converts the +12 VDC received into constant and precise +5 VDC to drive the microprocessor on the motor control circuit board which manages the motor speed. With power supplied to the microprocessor, the mixing device is in a powered "on" state and able to mix solutions placed thereon.

Rotating the potentiometer shaft clockwise from a fully counter-clockwise position increases the voltage sent to the microprocessor from a ground baseline voltage whereby the potentiometer voltage digitally represents the angular position of the potentiometer shaft and the selected motor shaft speed. Provided the voltage received from the potentiometer exceeds a pre-programmed threshold voltage, the microprocessor sends output voltage to illuminate an LED proximate the potentiometer on the base to indicate a virtual "on" state until the voltage received drops below the threshold voltage.

The microprocessor compares the voltage input from the potentiometer and the feedback voltage from the Hall-effect sensor array to a pre-programmed table of speed equivalent voltages and determines how the motor shaft speed needs to be adjusted. The microprocessor instructs the PWM module to effect the appropriate change in commutation limited in scope by the maximum incremental step whereby the PWM module regulates the frequency and duration of the voltage sent to the motor's phased stator windings and adjusts the speed of the motor shaft towards that of the selected speed. The microprocessor continues to monitor and manage the motor shaft speed and directs the appropriate step towards achieving and maintaining the selected speed.

Once the microprocessor receives input voltage from the potentiometer that exceeds the threshold power "on" voltage, the microprocessor directs the electronic commutation of the motor and the motor starts to spin. The motor shaft and the friction ring preferably rotate at the same rate. Rotation of the friction ring imparts a tangential force on turntable groove outer wall which causes the turntable to rotate about its central axis on the turntable shaft. The rotating turntable carries the tilt assembly and the attached platform about the turntable shaft whereby the tilt assembly allows the attached platform to trace a non-rotational orbit above the base as the pivot shaft rotates within the ball bearing. The platform orbiting above the base changes the tension and compression forces placed on the flexible connectors which affects their degree of straightness and causes the tilt assembly to pivot on the connecting rod and wobble back and forth in turntable pivot channel whereby the platform tilts or yaws in relation to the movement of the tilt assembly. The movement of the platform provides both vertical and horizontal agitation of the solutions placed thereon. As the potentiometer shaft is manually selectively rotated clockwise or counter-clockwise to adjust the desired agitation rate, the degree of vertical and horizontal movement of the platform increases or decreases respectively. Agitation will continue until the voltage input to the microprocessor drops below the pre-programmed threshold voltage.

BRIEF DESCRIPTION OF THE DRAWINGS

FIG. 7 illustrates a circuit diagram for a +12 VDC to +5 VDC voltage sub-regulator circuit of the drive mechanism of the mixing device;

FIG. 7a shows an exploded partial circuit diagram for the voltage regulator of the drive mechanism of the mixing device;

FIG. 8f shows an exploded partial circuit diagram for a second pull-up resistor array in the drive mechanism of the mixing device;

FIG. 8g depicts an exploded partial circuit diagram for a noise filter capacitor array in the drive mechanism of the mixing device;

FIG. 8h shows an exploded partial circuit diagram for a Schmitt-Trigger logic buffer array in the drive mechanism of the mixing device.

DETAILED DESCRIPTION OF THE PREFERRED EMBODIMENT AND OPERATION OF THE INVENTION

Figure 1:
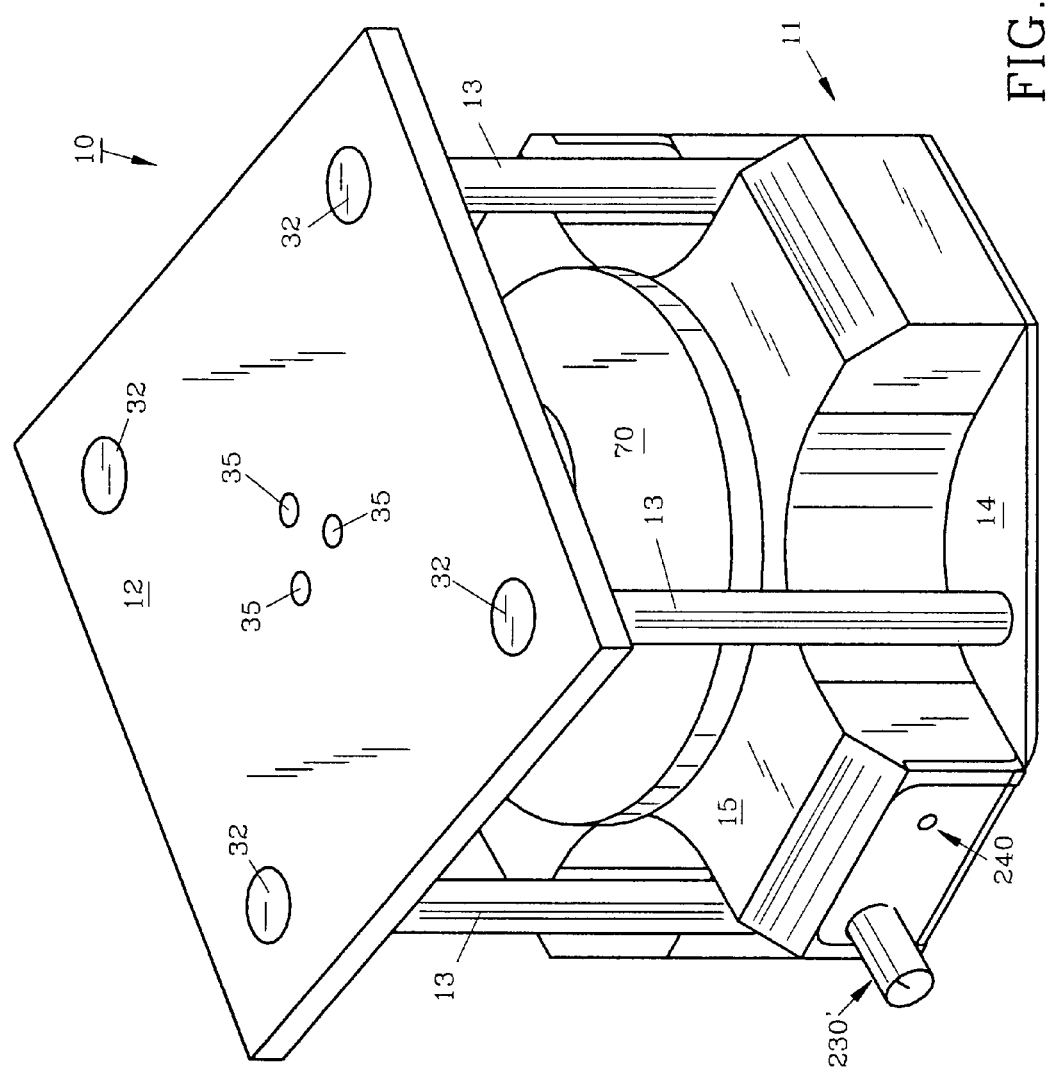
FIG. 1 shows a right side perspective view of the mixing device of the present invention.
Figure 2:
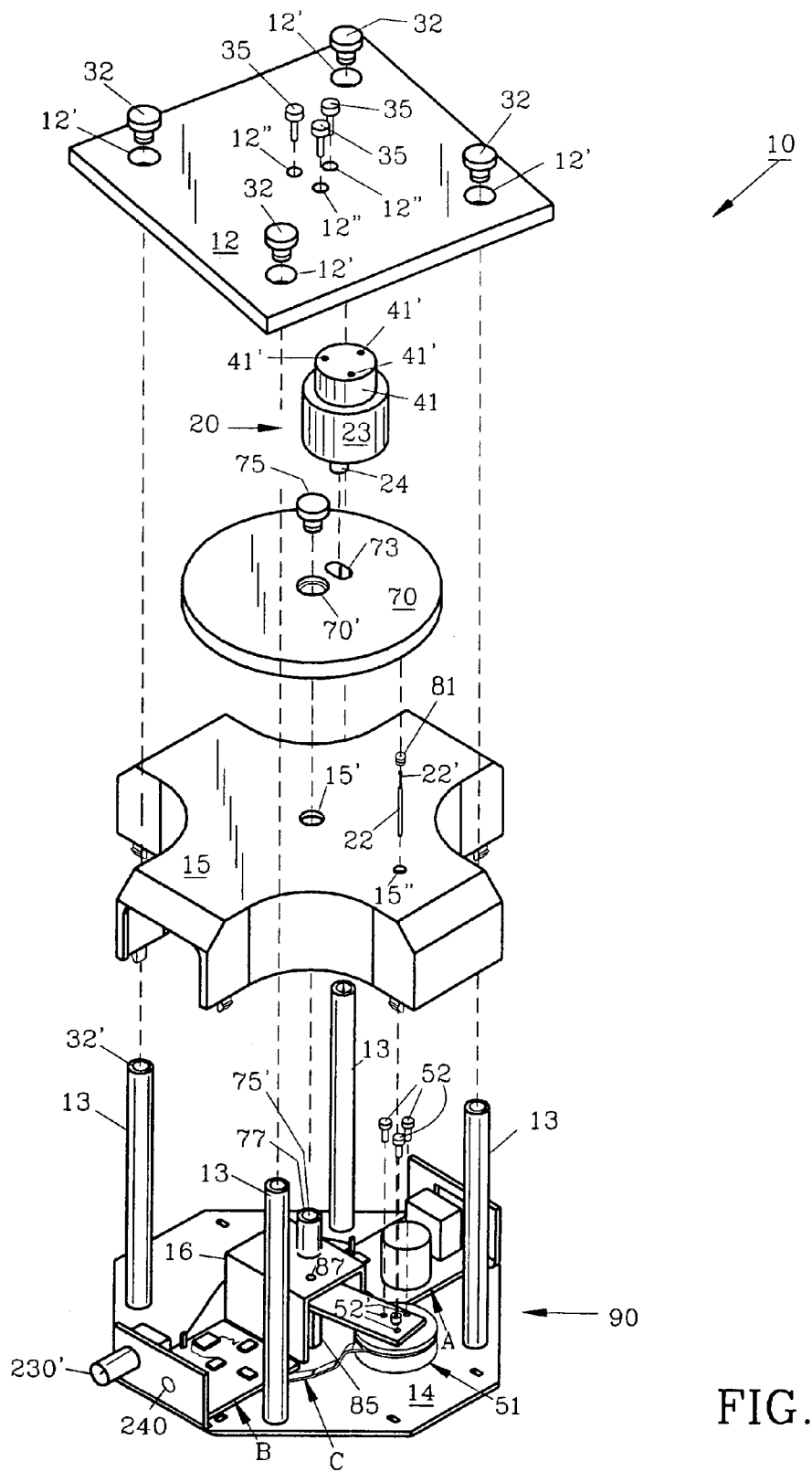
FIG. 2 shows an exploded isometric view of the preferred mixing device.

Turning now to the drawings for a better understanding of the preferred invention and its method of operation, FIGS. 1-2 show preferred mixing device 10 which includes base 11 and drive mechanism 90. Drive mechanism 90 is attached to base 11 and comprises brushless DC motor 51, motor mount assembly 91 attached to motor 51 and pivotally attached to base 11, turntable 70 with central shaft 77 rotationally attached to base 11 and defining circular turntable groove 82, vertical motor shaft 22 extending from motor 51 into turntable groove 82 and defining groove 22' with friction ring 81 affixed thereon for engaging and rotating turntable 70, tilt assembly 20 pivotally attached turntable 70 that is rotatable thereunder and rigidly attached to platform 12 thereabove, platform 12 attached to base 11 by a plurality of flexible connectors 13, and electrical circuitry including a pair of circuit boards attached to base 11 and comprising power control circuit board A in electrical communication motor control circuit board B with microprocessor 110 in electrical communication with motor 51 for managing the power supplied thereto and the speed thereof to achieve and maintain manually selected speed received from potentiometer 230 serving as a manually adjustable incremental speed control switch through rotation of potentiometer shaft 230'. As seen in FIG. 1, base 11 includes planar portion 14, which is preferably metal and does not increase the size of the footprint of mixing device 10, to which X-shaped base housing 15 is attached above thereon and preferably comprises a polymeric material. While an X-shape is preferred for the housing, any similar shape could be used such as a Y-shape (not shown) or a V-shape (not shown), so long as corners are formed for allowance of a plurality of flexible connectors 13 to be attached thereon. Base housing 15 covers motor mount assembly 91, circuit board A, and circuit board B and while turntable 70 is rotatable thereabove as seen in FIG. 2. Although not shown, planar base portion 14 may have a plurality of standard elastomeric feet attached thereunder for providing additional vibration reduction and positional stability of mixing device.

As further seen in FIG. 2, platform 12 defines platform apertures 12' for receiving platform fasteners 32 and attaching to flexible connectors 13 positioned thereunder. Platform fasteners 32 preferably comprise conventional Allen head bolts with cylindrical nuts 32' whereby the heads of platform fasteners 32 engage platform 12 flush to the top thereof and the threaded shafts of platform fasteners 32 extend through platform apertures 12' and threadably engage cylindrical nuts 32' pressure fitted within the tops of flexible connectors 13. Flexible connectors 13 are preferably transparent, flexible polyvinyl chloride tubing, although other standard flexible connectors could be used, either polymeric, natural or other spring materials. Raised knobs 14' (FIG. 3) are attached to planar base 14 and extend thereabove where they are pressure fitted within the lower ends of flexible connectors 13 for attaching flexible connectors 13 to planar base portion 14. Conventional slip ties (not shown) may be used to constrict flexible connectors 13 at the top and bottom to provide clamping for increasing the frictional engagement of pressure fitted platform fasteners 32 and raised knobs 14'. Platform 12 is rigidly attached to the top of tilt assembly 20 as seen in FIG. 2.

Figure 4:
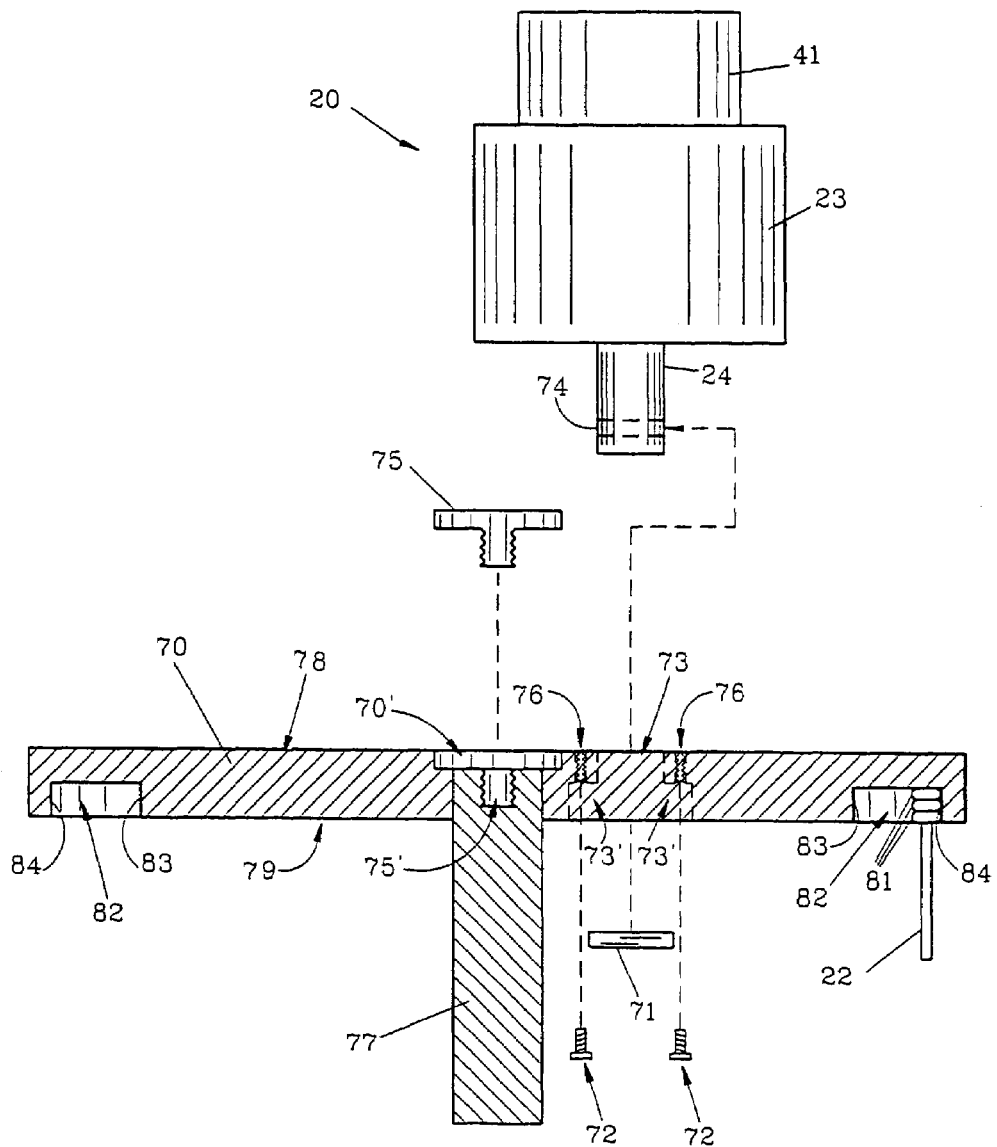
FIG. 4 depicts a partial elevational cross-sectional view of the turntable of the mixing device.

Tilt Assembly 20 is a multi-component unit seen in FIGS. 2 and 4 comprising pivot shaft 24 having pivot slot 74, threaded post 41 defining threaded apertures 41' on the top thereof, collar 23 surrounding threaded post 41, a ball bearing (not shown), connecting rod 71, and an internal spring (not shown) which rests on the floor of collar 23 and abuts the interior surface of threaded post 41 to prevent any drift thereof during rotation. Collar 23 is preferably metal such as brass and may have surface features (not shown) to improve grip exteriorly thereon. Collar 23 is interiorly threaded (not shown) for engaging threaded post 41 which permits threaded post 41 to be raised or lowered inside collar 23 as desired. Manual, selective clockwise or counterclockwise rotation of collar 23 raises or lowers threaded post 41 respectively therein. As seen in FIG. 2, threaded post 41 is rigidly affixed to platform 12 centrally positioned thereabove. Post fasteners 35 extend down through platform apertures 12" of platform 12 and received in apertures 41' on the top of threaded post 41 therebelow whereby fasteners 35 and apertures 41' are preferably threadably mated and fasteners 35 engage platform 12 flush to the top thereof. The ball bearing (not shown) is preferably a 0.375 inch bore (0.953 cm) standard stainless steel ball bearing with pivot shaft 24 pressure fitted therein and collar 23 rigidly affixed to the bearing for rotation about pivot shaft 24.

Figure 5:
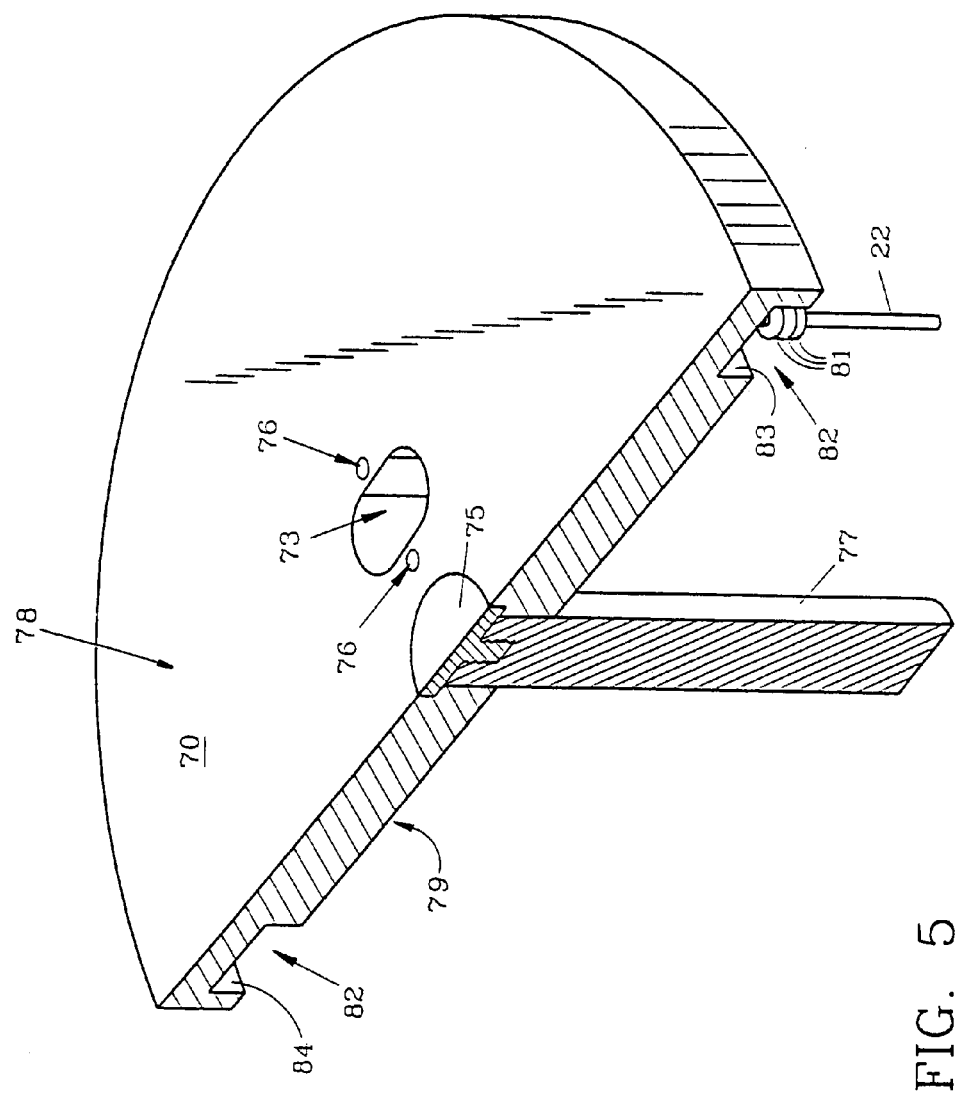
FIG. 5 demonstrates an isometric cross-sectional view of the turntable of the mixing device.

Turntable 70 preferably comprises a rigid disc of machined aluminum although other rigid materials may be used. As shown in FIGS. 4 and 5, turntable 70 includes top surface 78 and bottom surface 79 with circular groove 82 along the circumference of bottom surface 79. Circular groove 82 does not extend to top surface 78 as seen in FIG. 4. As shown in FIGS. 2 and 4, turntable 70 defines shouldered central aperture 70' for receiving vertical turntable shaft 77 secured therein by turntable fastener 75, and pivot channel 73 which is substantially oval in shape and spaced from central aperture 70' for receiving tilt assembly pivot shaft 24. Turntable pivot channel 73 is spaced from turntable aperture 70' and accordingly offset from the center of turntable 70 whereby rotation of turntable 70 will allow tilt assembly 20 to wobble back and forth within turntable pivot channel 73 while tilt assembly 20 is attached to platform 12. Turntable 70 further defines opposing extension channels 73' for receiving connecting rod 71, and fastener channels 76 for receiving rod fasteners 72. Pivot channel 73 intersects and is in communication with extension channels 73' which are positioned transverse the shorter axis thereof and open to bottom surface 79 of turntable 70 as shown in FIG. 4. Fastener channels 76 are preferably threaded in an orientation parallel with turntable 70's axis of rotation and spaced radially therefrom on either side of pivot channel 73 above extension channels 73' and are accessible from below turntable 70. (FIG. 5) As seen in FIG. 4 tilt assembly 20 is pivotally attached to turntable 70 by pivot shaft 24 along connecting rod 71 which is secured and maintained within pivot channel 73 by rod fasteners 72. Pivot shaft 24 defines pivot slot 74 for receiving connecting rod 71 at a position below top surface 78 of turntable 70 for preventing upward removal of pivot shaft 24 from pivot channel 73. Connecting rod 71 is preferably longer than the length of pivot slot 74 such that the ends of connecting rod 71 extend equally beyond pivot shaft 24 when received therein. With connecting rod 71 received by pivot slot 74, extension channels 73' receive the ends of connecting rod 71 as pivot shaft 24 is moved towards top surface 78 of turntable 70 whereby such movement is limited by connecting rod 71 internally engaging turntable 70 within extension channels 73' and transversely intersecting pivot channel 73 along its shorter axis. Connecting rod is attached within turntable 70 by rod fasteners 72 received by fastener channels 76. Rod fasteners are preferably threaded to coincide with the preferred threaded fastener channels 76 and from below turntable 70 threadably engage therein. The heads of rod fasteners 72 engage different ends of connecting rod 71 extending into extension channels 73' for maintaining the same within turntable 70 and allowing tilt assembly 20 to pivot back and forth through a vertical position along connection rod 71 in pivot channel 73 and permitting platform 12 attached to tilt assembly 20 to tilt or yaw during rotation. Although not shown, fastener channels 76 may be sized to terminate within turntable 70 rather than extending through top surface 78 thereof provided rod fasteners 72 received therein engage and maintain connecting rod 71 within turntable 70.

As further seen in FIGS. 4 and 5 turntable 70 includes vertical shaft 77 which is centrally, rigidly attached through aperture 70' by fastener 75 and rotationally attached to planar base 14 at its lower end (not seen). Turntable shaft 77 is preferably a rigid machined aluminum rod defining aperture 75' on its top end for receiving fastener 75. Fastener 75 engages turntable 70 and is maintained flush therewith as seen in FIG. 5. Turntable shaft 77 is received and rotatable within base housing 15 (FIG. 2) through base housing aperture 15' whereby turntable 70 is rotatable thereabove. In an alternate embodiment not shown, turntable 70 and turntable shaft 77 may be combined and formed from one continuous rigid material rather than with separate combinable parts as shown.

Figure 3:
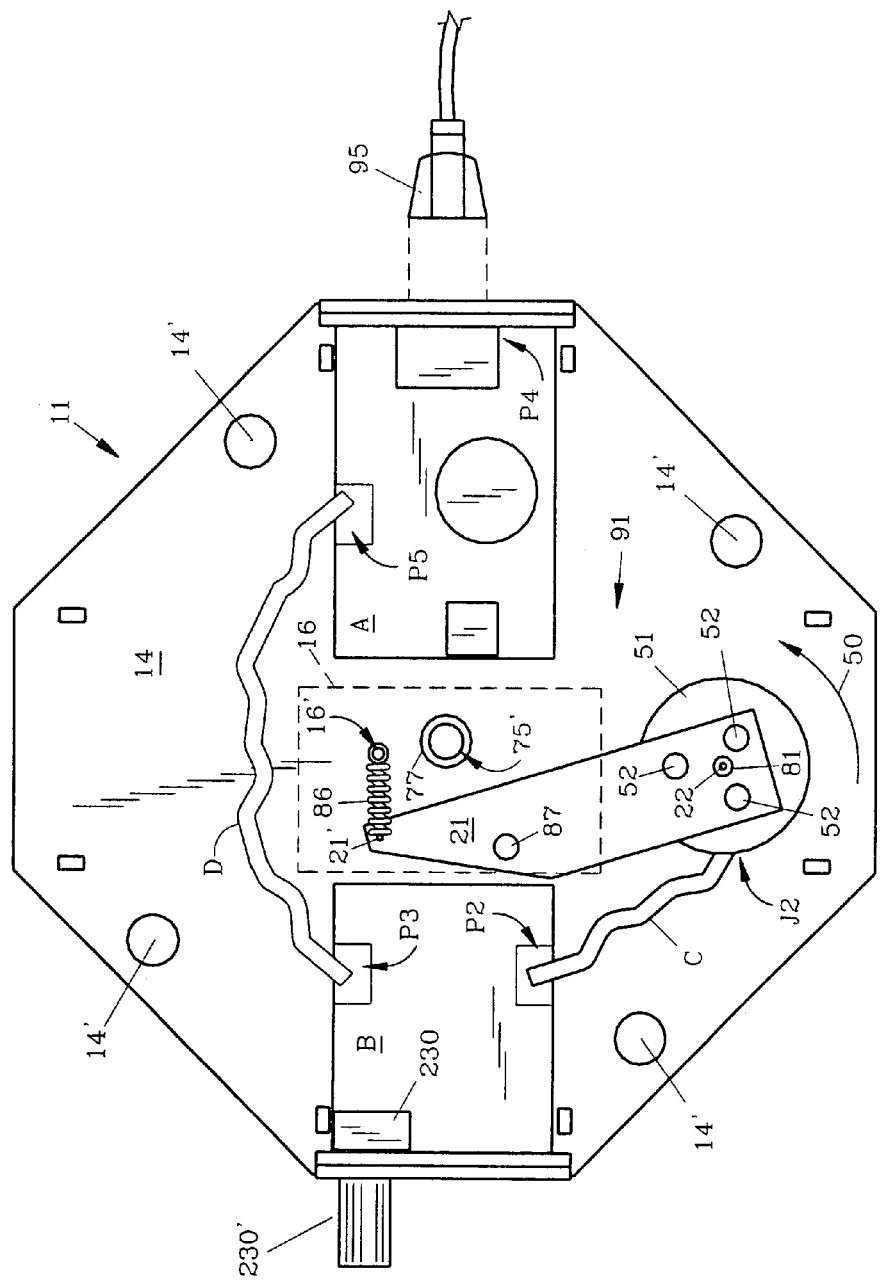
FIG. 3 illustrates a schematic partial top view with the turntable removed of the base of the mixing device.

As seen in FIG. 3, motor 51 is rigidly affixed to motor mount assembly 91 which comprises arm 21, spring 86, and vertical pivot shaft 85. Motor mount pivot shaft 85 is motor mount assembly 91 comprises arm 21 having aperture 21' for receiving spring 86. Spring 86 is a conventional spring having looped ends and is attached at one end to spring aperture 21' and at the opposite end to spring base mount 16' of rotational stabilizing member 16. Arm 21 is rigidly attached to pivot shaft 85 as shown in FIG. 2. Although not shown, pivot shaft 85 is pivotally attached to planar base portion 14 whereby arm 21 is pivotable above planar base portion 14 through pivot shaft 85 for allowing motor 51 to move arcuately above and across planar base portion 14 in a plane parallel thereto as seen by directional arrow 50 in FIG. 3. Motor 51 is rigidly attached to arm 21 by threaded motor mount fasteners 52 shown in FIGS. 2 and 3 which are received within motor apertures 52' of arm 21 and threadably engage threaded motor channels (not shown) in motor 51 whereby the shafts of motor mount fasteners 52 extend through motor mount arm 21 into motor 51 therebelow and the heads of motor mount fasteners 52 engage arm 21. Although fasteners are preferred, attachment via other means of rigid attachment such as welding is also contemplated.

Rotational stabilizing member 16 shown in FIG. 2 is preferably rigidly attached to planar base 14 with fasteners (not shown) but may also be welded thereto. Rotational stabilizing member 16 comprises an inverted U-shaped housing but other shapes, such as an opposingly open-ended rectangular box (not shown), that guide and stabilize rotatable elements extending therethrough as discussed herein are also contemplated.

Rotational stabilizing member 16 shown in ghost form in FIG. 3 defines a turntable aperture (not shown) spaced from a pivot shaft aperture (not shown) through which turntable shaft 77 and motor mount pivot shaft fastener 87 are respectively received and rotatable therein. (FIGS. 2,3) Pivot shaft 85 is preferably a rigid vertical aluminum bar and is rotationally affixed to planar base portion 14 and rigidly attached to arm 21. Fastener 87 is rigidly affixed to pivot shaft 85 and rotationally links the same to rotational stabilizing member 16 as it extends therethrough. (FIG. 2) Motor mount pivot shaft 85 is pivotally attached at its lower end to planar base portion 14 such that motor mount arm 21 is parallel to, positioned above and pivotable over planar base portion 14. Motor mount spring 86 is attached to spring mount 16' on rotational stabilizing member 16 for providing an anchor from which motor mount spring 86 may be stretched for applying rotational tension on motor mount arm 21 about motor mount pivot shaft 85. To allow turntable groove 82 to receive motor shaft 22, motor mount arm 21 must be rotated radially, inwardly in relation to turntable 70 about motor mount pivot shaft 85. Rotational movement of motor mount arm 21 extends motor mount spring 86 and "spring loads" motor mount assembly 91. The tension force created by stretched motor mount spring 86 pivots motor mount arm 21 radially outward in relation to turntable 70 whereby friction ring 81 engages and maintains contact with turntable outer groove wall 84 and prevents motor mount spring 86 from returning to an unstretched state of rest. Motor mount 91 is preferably "spring loaded" prior to motor 51 receiving motor shaft 22.

Housing 15, seen in FIG. 2 includes aperture 15' for receiving shaft 77 and aperture 15" for receiving motor shaft 22. Motor shaft 22 extends through and is rotatable therewithin and is centrally rigidly attached to motor 51 at its lower end through arm shaft aperture (not shown) in arm 21. Motor shaft 22 defines groove 22' towards its upper end for receiving friction ring 81 which is pressure fitted thereon. Friction ring 81 is preferably a durable resilient inert polymeric material and may be comprised of one or a plurality of rings. As seen in FIGS. 4 and 5, turntable 70 includes circular groove 82 having inner wall 83 and outer wall 84 and opens to bottom surface 79 of turntable 70. Turntable groove 82 receives motor shaft 22 whereby friction ring 81 engages outer groove wall 84. When motor shaft 22 is rotated by motor 51, friction ring 81 preferably rotates without slippage on motor shaft 22 and against turntable outer groove wall 84 which imparts a frictional force (not shown) thereon that is substantially tangential to the central axis of turntable 70 whereby turntable 70 is driven to revolve around its central axis along vertical shaft 77.

As turntable 70 is rotated, tilt assembly 20 pivots in pivot channel 73 thereby causing collar 23 to rotate thus rotating platform 12 therewith. This movement causes platform 12 to circumscribe an eccentric orbit over base 11 since the center of platform 12 is not directly above the center of base 11. Threaded post 41 can be manually raised and lowered within collar 23, thus changing the distance between platform 12 and base 11. Since tilt assembly 20 is rotating, threaded post 41 has a tendency to "drift" downwardly on the internal threads of collar 23, thus changing the positioning of platform 12. The coil spring (not seen) in tilt assembly 20 is tensioned between collar 23 and threaded post 41 and corrects this "drifting" by biasing threaded post 41 so that threaded post 41 does not rotate downwardly within collar 23 as turntable 70 moves in its circular path. As threaded post 41 is lowered within collar 23, more tension is put upon the coil spring (not shown) of tilt assembly 20.

The ability to raise and lower threaded post 41 and platform 12 is impacted by the shape and positioning of tubular flexible connectors 13. When platform 12 is raised to the maximum, flexible connectors 13 are generally straight and undistorted. When turntable 70 is rotated and tilt assembly 20 swings platform 12 in its orbit over base 11, each arm remains essentially straight and platform 12 remains level. Thus, a biological/chemical solution can be mixed via a horizontal swirling motion with little or no vertical agitation. However, when platform 12 is lowered, flexible connectors 13 are distorted and compressed into non-linear shapes. As platform 12 is rotated, each flexible connector 13 in turn is straightened. The corresponding corner of platform 12 is raised to its highest point above base 11 when its flexible connector 13 is straight. The remaining corners of platform 12 are in varying degrees of straightness closer to base 11, with the opposite corner generally being the lowest position. Flexible connectors 13 associated with these lowered corners are distorted into non-linear shapes, the amount of distortion being generally inversely proportional to the height of the corresponding corner above base 11. The lower platform 12 is selectively positioned, the greater the tilt thereof. Thus, manual rotation of collar 23 raises and lowers platform 12 to allow selection of the degree of tilt of platform 12. The tilting of platform 12 along with the orbital path that platform 12 circumscribes causes both horizontal and vertical agitation of solutions placed thereon. Therefore, selective adjustment to the degree of tilt of platform 12 allows the choice of the vertical agitation induced into the solution during use of mixing device 10. A commercially available rubberized non-slip pad (not shown), preferably a resilient polymeric material having an irregular surface, can be placed on the top of platform 12 so as to provide additional frictional engagement and prevent items such as beakers, dishes or other containers (not shown) from sliding along tilted platform 12.

As would be understood, mixing device 10 must be in electrical communication with an electric power source in order to function. Power is supplied to mixing device 10 as illustrated in FIG. 3 through standard power cord 95 which is in electrical communication with power control circuit board A at connector P4. Power control circuit board A cleans the potentially poorly regulated and unstable plurality of electric currents and voltages supplied to mixing device 10 and converts the current into +12 VDC. Motor control circuit board B seen in FIG. 3 is in electrical communication with power control circuit board A via wire harness D and potentiometer 230 which operates as a manual speed control switch for selectively setting desired rotational speed of motor 51. Line operated switch-mode power supply circuit 300, contained on power control circuit board A of mixing device 10, is depicted in schematic form in FIG. 6. Power supply circuit 300 will accommodate both domestic 120 VAC and foreign 250 VAC at 60 Hz and 50 Hz to operate device 10 without necessitating circuit reconfiguration. AC line voltage is supplied to power supply circuit 300 at interface 301 with connector P4 while AC ground voltage and AC neutral voltage are linked to power supply circuit 300 at interfaces 302 and 303 respectively with connector P4. Fuse 310, preferably rated 0.250 AMP-240 VRMS, protects power supply circuit 300 against over-current and risks of fire, while standard metal oxide varistor 320 prevents circuit damage from input voltage transients. Common-mode configured transformer 330, which is preferably model CTX300-4 by Coiltronics Inc. available from Bravo Electro Components, Inc. of Santa Clara, Calif. and rated 1.6 mH, and its preceding capacitor 331 protect power supply circuit 300 from high frequency noise. Capacitor 331 is preferably rated 0.22 µF-275 vac. Bridge rectifier 340 converts the supplied AC line voltage into unregulated high-voltage DC which is filtered by capacitor 341 and subsequently presented to primary windings 355 of high-frequency transformer 350, preferably model XF0013-EPD20S by XFMRS, Inc. of Camby, Ind., whereby leading-edge voltage spikes caused by transformer 350 inductance leakage are clamped between diodes 342 and 343. Switching regulator 370, preferably part number TOP224Y manufactured by Power Integrations, Inc. of San Jose, Calif., then modulates the unregulated high-voltage DC within high-frequency transformer 350 via pulse-width modulation at a high frequency. Switching regulator 370 interacts with power supply circuit 300 with connections including drain pin 373, common pin 374, and source pin 375. Energy driven into high-frequency transformer 350 appears on its output power windings 360. Transformer bias winding 365 is rectified and filtered by diode 366 and capacitor 367 to create a bias voltage to be used by switching regulator 370 to convert voltage to desired +12 VDC output. Optocoupler 380, preferably consisting of a standard gallium arsenide infrared emitting diode (not shown) driving a silicon phototransistor (not shown) in a 4-pin dual in-line package (not shown) such as part number H11A817A produced by Fairchild Semiconductor Corporation of South Portland, Me., feeds the amplitude back to switching regulator 370 through an electrically optically isolated path. Switching regulator 370 is able to drive into transformer 350 the precise amount of energy necessary through secondary power windings 360 to produce +12 VDC output voltage at interface 304 with connector P5 on power control circuit board A, once rectified by diode 361 and filtered by capacitors 362 and 363. Power supply circuit 300 is returned to ground at interface 305 with connector P5 on power control circuit board A. The +12 VDC output voltage created by power supply circuit 300 at interface 304 is determined by a combination of the voltage of Zener diode 381 and voltage drops across optocoupler 380 and resistor 382. Resistor 383 and Zener diode 381 improve the load regulation at light loads by providing a slight pre-load on the +12 VDC output. Capacitor 364 serves to bypass high frequency noise while capacitor 371 and resistor 372 compensate feedback loop for voltage regulation leading into switching regulator 370. Power supply circuit 300 preferably comprises components with the following ratings: capacitor 341 rated 100 UF-450V-20%; diode 342 rated 200V-600 W Peak; diodes 343, 361 and 366 each rated 600V; capacitors 363 and 367 each rated 0.1 UF-50V-10%; capacitor 363 rated 470 μF-25V-20%; capacitor 364 rated 1000 PF-250V-10%; capacitor 371 rated 47 UF-20V-20%; resistor 372 rated 6.81 OHM-¼ W-1%; Zener diode 381 rated 1.5 W/11V; resistor 382 rated 100 OHM-⅒ W-1%; and resistor 383 rated 221 OHM-⅒ W-1%.

Figure 8:
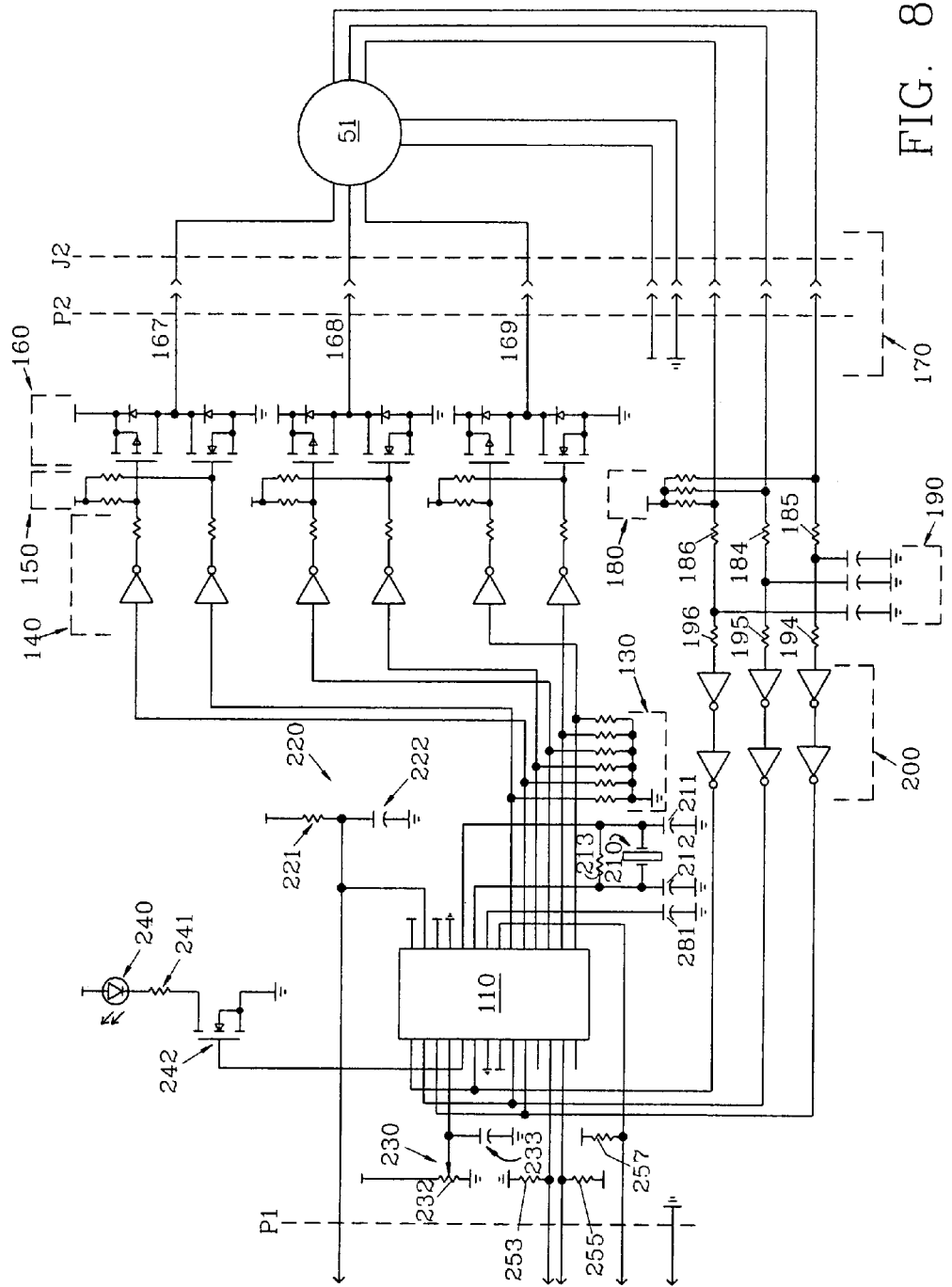
FIG. 8 shows a preferred circuit diagram for the drive mechanism of the mixing device.

FIG. 7 shows an electrical schematic for +12 VDC to +5 VDC voltage sub-regulator circuit 400 contained on motor control circuit board B of mixing device 10 for driving microprocessor 110 (FIG. 8). Motor control circuit board B receives a current of +12 VDC of potentially poor regulation and stability which is supplied to voltage sub-regulator circuit 400 at interface 403 with connector P3 on motor control circuit board B. Voltage sub-regulator circuit 400 is sourced to ground at interface 404 with connector P3 on motor control circuit board B. Interface 420 is +12 VDC to be used by motor control circuit board B. Loading resistors 410-411 are employed at input of voltage sub-regulator circuit 400 to present a minimal load at all times for maintaining stability of the upstream line operated power supply 300 while capacitors 412-418 of various size and characteristic are employed before and after standard voltage regulator 430 to remove noise and to improve stability. +12 VDC is inputted into voltage regulator 430 at input 431 (FIG. 7a). Voltage regulator 430 maintains stable and precise +5 VDC output at output 432 provided a sufficient voltage margin above +5 VDC is maintained at input 431. Voltage regulator 430 is lead to ground through outputs 433-436. Voltage sub-regulator circuit 400 outputs to motor control circuit board B +5 VDC at interface 401 and to ground at interface 402 which is used by microprocessor 110. Voltage sub-regulator circuit 400 preferably comprises components with the following ratings: loading resistors 410-411 rated 1.00K-⅓ W-1%; capacitors 412, 414, and 416-417 each rated 0.1 UF-50V-10%; capacitor 413 rated 470 μF-25V-20%; capacitors 415 and 418 each rated 10 UF-20V 0 10%.

Figure 8A:
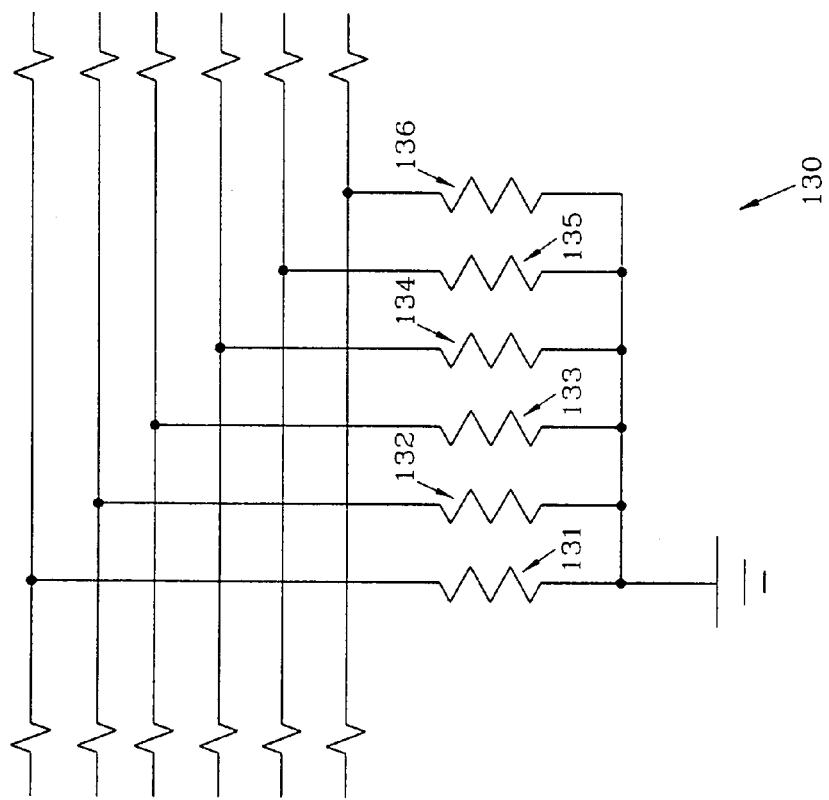
FIG. 8a depicts an exploded partial circuit diagram for a pull-down resistor array in the drive mechanism of the mixing device.
Figure 8D:
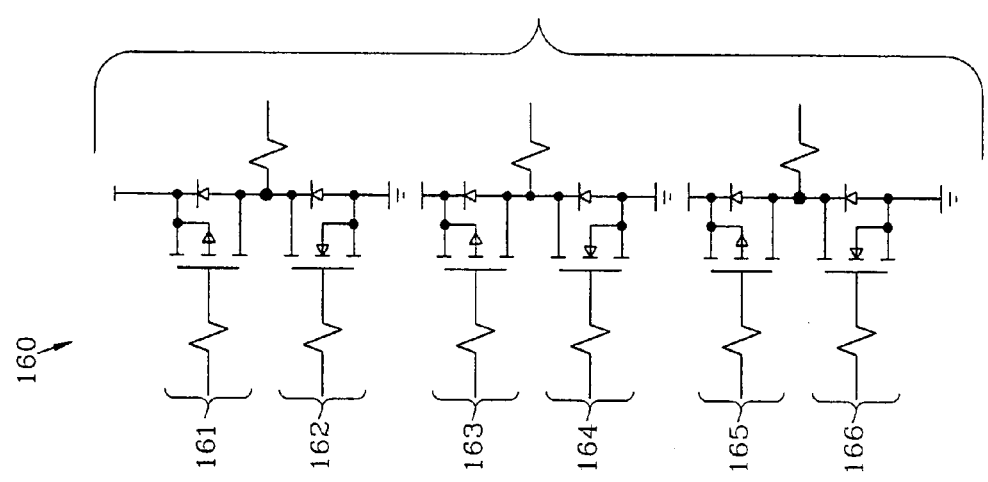
FIG. 8d shows an exploded partial circuit diagram for a transistor output array in the drive mechanism of the mixing device.
Figure 8B:
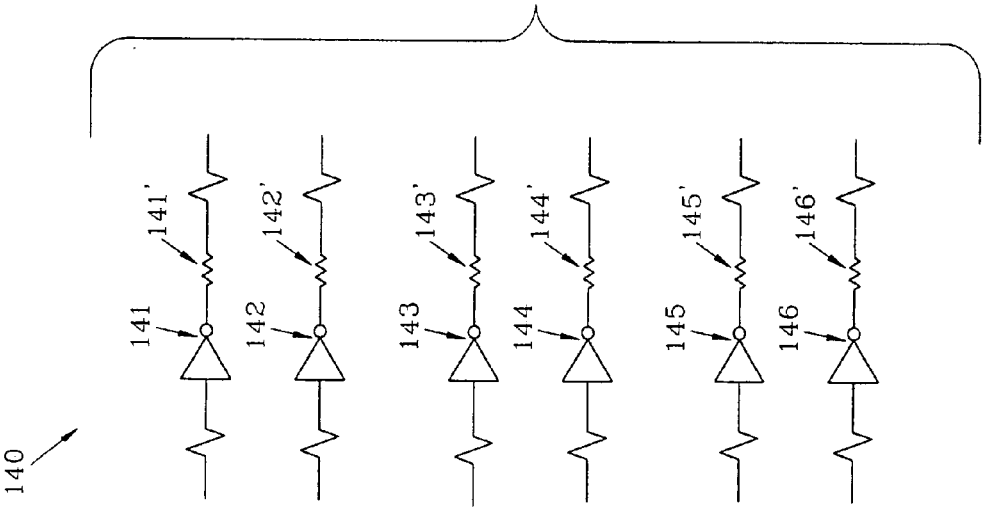
FIG. 8b shows an exploded partial circuit diagram for an open-collector buffer array in the drive mechanism of the mixing device.
Figure 8E:
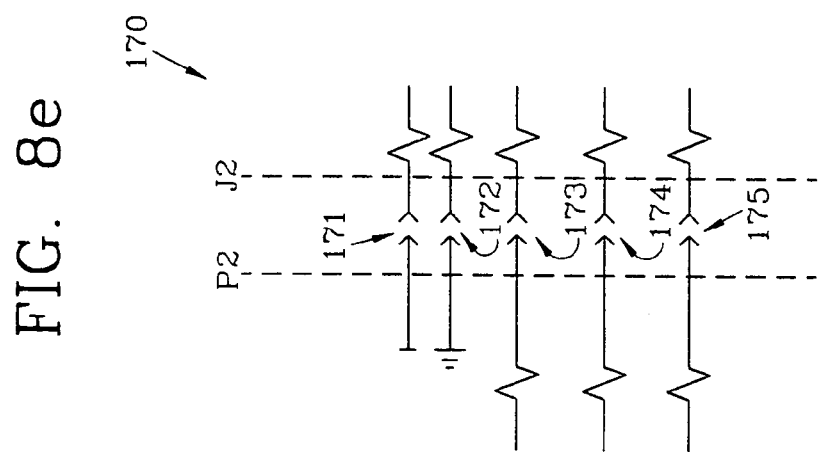
FIG. 8e demonstrates an exploded partial circuit diagram for a Hall-effect sensor array in the drive mechanism of the mixing device.

FIG. 8 is a partial electrical schematic of motor control circuit board B for managing preferred three-phase brushless DC motor 51 with integral Hall-effect sensor feedback array 170 schematically depicted in FIG. 8e of mixing device 10. Motor 51 functions are controlled by microprocessor 110, preferably an 8-bit Motorola USMC68HC908MR8CDW microprocessor, comprising pulse-width modulation ("PWM") module 120 with pre-programmed application software-implemented functions (not shown) providing (1) a compensated feedback algorithm to effect precise speed control including compensation of the effects of mechanical inertia and loading, and (2) a virtual power switch that eliminates routing line voltage carrying conductors to a combination potentiometer-switch assembly which keeps voltage low. FIG. 8e schematically illustrates microprocessor 110 and shows connecting pins referenced thereon.

PWM module 120, which includes output pins 121-126, regulates the energy sent to motor 51 to control rotational speed of motor shaft 22 for achieving desired speed corresponding to the manually selected set point. Each sensor in Hall-effect sensor array 170 monitors a separate phase of motor 51's three-phase stator windings 167-169 whereby phase one 167, phase two 168 and phase three 169 are monitored by Hall-effect sensors 175, 174, and 173 respectively. Hall-effect sensors 173-175, shown schematically in exploded form in FIG. 8e report back to microprocessor 110 the precise angle of motor shaft 22 at each one of motor 51's three-phase stator windings 167-169 whereby the feedback pulses from Hall-effect sensor array 170 are proportional to the rotational speed of motor shaft 22. Microprocessor 110 uses these feedback pulses to adjust the timing of the electronic commutation of motor 51 through each phase of its three-phase stator windings 167-169 to achieve rotation and maintain user selected rotational speed.

Figure 8C:
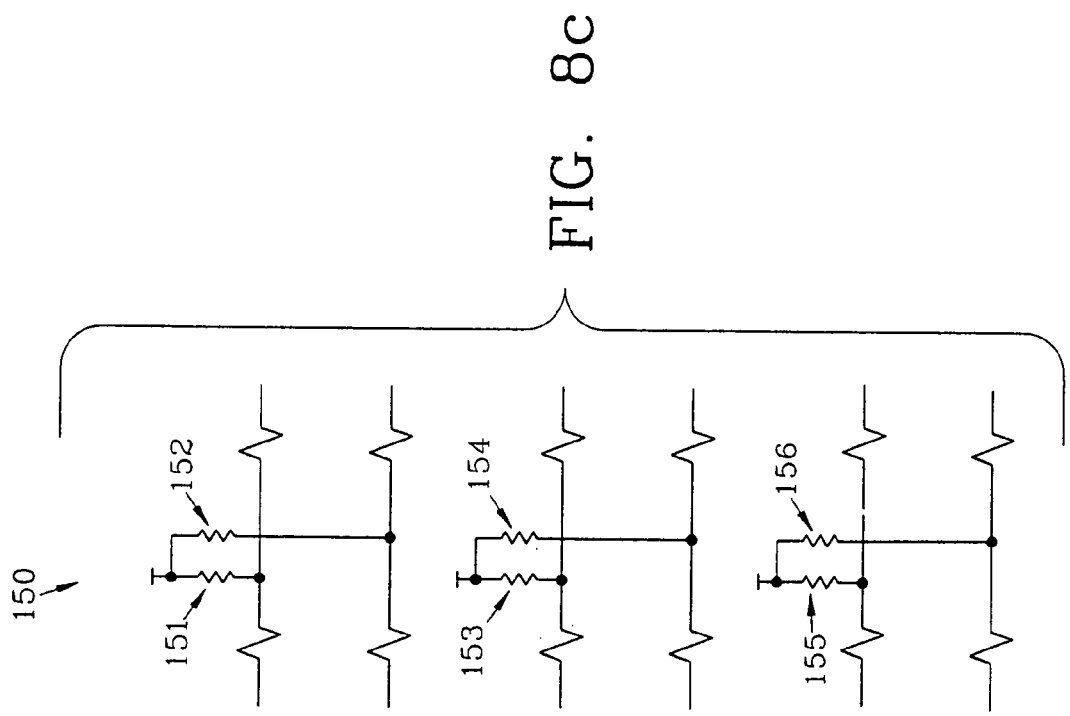
FIG. 8c illustrates an exploded partial circuit diagram for a first pull-up resistor array in the drive mechanism of the mixing device.
Figure 8I:
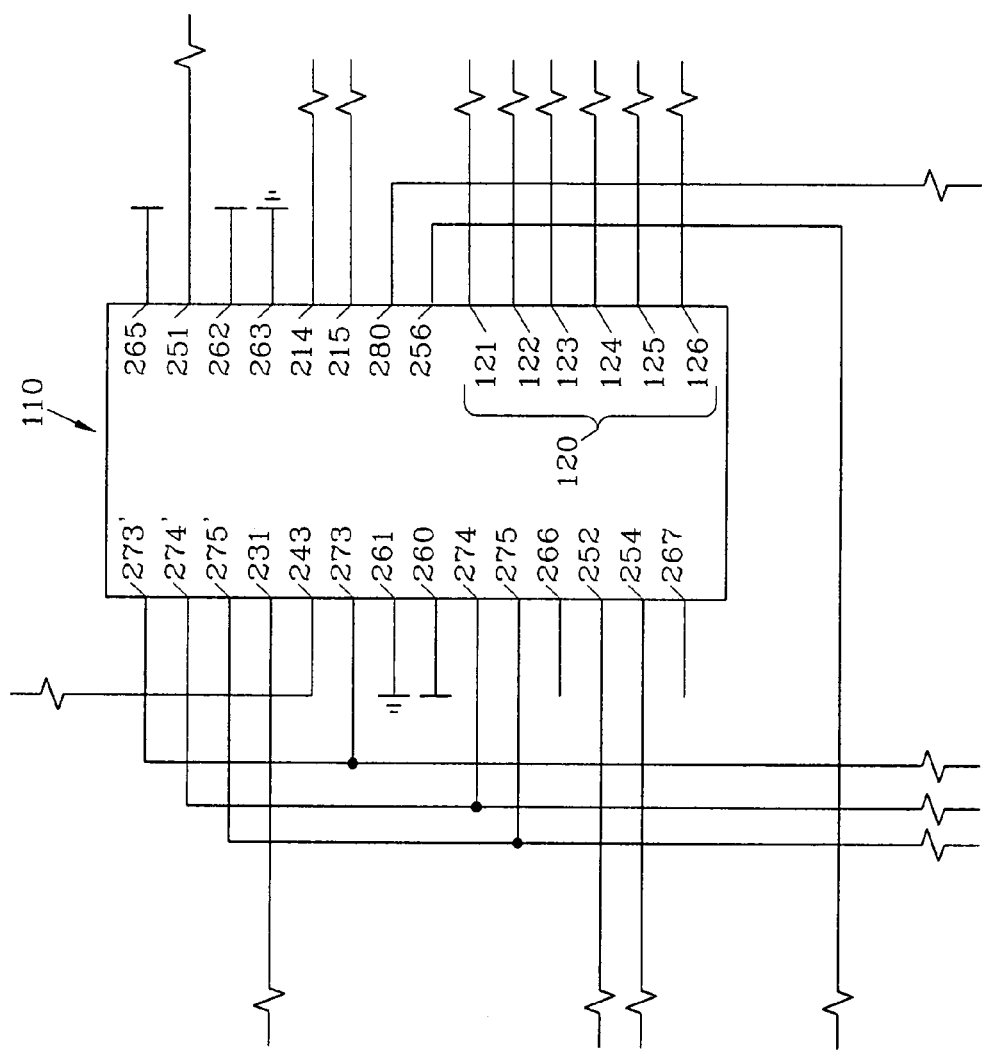
FIG. 8i shows an exploded partial circuit diagram for a microprocessor in the drive mechanism of the mixing device.

Internal clocking of microprocessor 110 is effected by 4 MHZ quartz crystal oscillator 210 with associated loading capacitors 211 and 212 and bias resistor 213, while a phase frequency-locked-loop (not shown) within-microprocessor 110 multiplies the frequency of crystal oscillator 210 into a higher clock rate. Crystal oscillator 210 and the phase-locked-loop (not shown) are part of the clock generating module ("CGM") (not shown) of microprocessor 110. Crystal oscillator 210 receives input from microprocessor 110 at pin 214 and returns output thereto at pin 215. External filter capacitor 281 filters out phase corrections for the CGM (not shown) and is connected to microprocessor 110 at pin 280. Loading capacitors 211 and 212 are preferably each rated 22 PF, 100V and 5%. Bias resistor 213 is preferably rated 10M-⅒W-5%. Power-on reset 220 of microprocessor 110 is effected by a time constant derived by charging reset delay capacitor 222 and filtered by resistor 221 or alternatively forced externally via connector P1. Motor control circuit board B is pre-programmed with standard and application specific software for functionality of microprocessor 110 contained thereon. Application specific software includes algorithms (not shown) to process the effect of loading platform 12 on the rotational speed of motor shaft 22 as well as power management of device 10 previously discussed. The application specific software is based on a standard proportional integral derivative commonly used for electronic commutation of motors however the derivative is not used since velocity is variable and not linear. The application specific software and modifications thereto is loaded into microprocessor 110 at connector P1 by activating reset pin 251 while IRQ pin 256 is held at logic zero allowing serial communications with microprocessor 110 via data transmitting pin 252 and data receiving pin 253. Resistors 253, 255, and 257 filter the current in communication with microprocessor 110. Additionally, for production purposes, multiple microprocessors may be programmed simultaneously before affixed to motor control circuit board B with a standard chip programmer whereby each microprocessor is plugged into a separate socket of the programmer and the application specific software is loaded into the flash memory of each loaded microprocessor at the same time. With application software resident and running, microprocessor 110 derives the digital representation of the shaft position of potentiometer 230 via an internal 10-bit analog-to-digital converter ("ADC") peripheral (not shown). Potentiometer 230 acts as a speed control input device by serving as a simple voltage divider between ground and +5 VDC when potentiometer shaft 230' is fully counterclockwise or fully clockwise respectively. FIG. 8i schematically represents an exploded view of the pin connections for microprocessor 110. Microprocessor 110 operates from a single power supply and receives +5 VDC at power supply pins 260 and 262 and is sourced to ground at 261 and 263, whereby pins 262 and 263 are the power supply and ground pins for the analog portion (not shown) of microprocessor 110 including the CGM (not shown) and the ADC peripheral (not shown). Pin 265 is the power supply input for setting a reference voltage used by microprocessor 110 particularly in the ADC peripheral (not shown). Pins 266 is a 7-bit general-purpose bidirectional I/O port that is shared with the serial communications interface module (not shown). Pin 267 is a 2-bit special function I/O port shared with PWM 120. Capacitors 222, 233, and 281 are preferably each rated 0.1 UF-50V-10%. Resistors 221, 253, 255, and 257 are each rated 47K-1/16 W-5%.

The preferred method of mixing closely follows the function of the device described herein. Agitation is initiated and controlled by manual selection of the desired mixing rate which is implemented by electronic commutation of motor 51 for rotation of motor shaft 22 and movement of the elements connected thereto. After device 10 is in electrical communication with a power source through interfacing with standard electric power cord 95 at connection P4 on power control circuit board A, the power supplied is converted as necessary by power control circuit board A through switch-mode power supply circuit 300 contained thereon to produce and output +12 VDC to motor control circuit board B via wire harness D interfacing connector P5 and P3 respectively. Voltage sub-regulator circuit 400 on motor control circuit board B where it is reduced to +5 VDC for driving microprocessor 110 and increased back to +12 VDC for driving motor 51. Microprocessor 110, with +5 VDC supplied thereto at pin 260, compares voltage input from potentiometer 230, which is filtered by resistor 232 and capacitor 233 and digitally represents the rotational position of potentiometer shaft 230', to the programmed voltage range to determine the desired manually selected rotational speed of motor shaft 22. Resistor 232 is preferably rated 10K. Upon a partial clockwise rotation of potentiometer shaft 230' from the fully counterclockwise position, a change in voltage from potentiometer 230 results and is recognized by microprocessor 110 at pin 231. If the voltage input from potentiometer 230 exceeds a pre-programmed threshold, microprocessor 110 reacts to voltage change and sends output current on LED pin 243 and driven by transistor 242, which is a general-purpose peripheral pin, through filtering resistor 241 to display LED 240 which illuminates display LED 240 for rendering a virtual "on" state. The illumination of display LED 240 depicts a virtual "on" state because mixing device 10 is only "off" when it is not in electrical communication with an electric power supply. Resistor 241 is preferably rated 2.21K-1/3 W-1%.

Drive of the stator windings of motor 51 is effected via output from microprocessor 110 at output pins 121-126 corresponding to PWM module 120. Pull-down resistor array 130, which is comprised of resistors 131-136 shown schematically in exploded form in FIG. 8a, insures a known drive state as microprocessor 110 initializes or if microprocessor 110 fails. The output from pull-down resistor array 130 is subsequently buffered by open-collector buffer array 140 via buffers 141-146 and resistors 141'-146' shown schematically in exploded form in FIG. 8b. Since microprocessor 110 is driven by +5 VDC and motor 51 is driven by +12 VDC, open-collector buffer array 140 additionally serves to translate the +5 VDC logic level of microprocessor 110 to +12 VDC. First pull-up resistor array 150, comprising resistors 151-156 shown schematically in exploded form in FIG. 8c and preferably each rated 1.00K-1/3 W-1%, serves to source +12 VDC to transistor output array 160 through transistor pairs 161-162, 163-164, and 165-166 shown schematically in exploded form in FIG. 8d. Transistor output array 160 in turn switches +12 VDC to motor 51 in such fashion that the lead to each phase of three-phase stator windings 167-169 is driven to either DC ground, +12 VDC, or be left floating, for effecting electronic commutation of motor shaft 22. Motor 51 is connected to three-phase-configured stator windings 167-169 and Hall-effect sensors 173-175 through interfacing with connectors P2 and J2 whereby Hall-effect sensors 173-175 are powered with +5 VDC and led to ground at 171 and 172 respectively as shown schematically in exploded form in FIG. 8e. Hall-effect sensors 173-175 detect the instantaneous shaft angle of motor 51 and are pulled to logic +5 VDC via second pull-up resistor array 180 via resistors 181-183 shown schematically in exploded form in FIG. 8f. The resulting feedback logic level voltage from Hall-effect sensors 173-175 which is a digital representation of the position of motor shaft 22 passes through resistors 184-186 before noise is filtered by noise filter capacitor array 190 by capacitors 191-193 shown schematically in exploded form in FIG. 8g and preferably each rated 470 PF-100V-5%. Next, the cleaned feedback current passes through resistors 194-196 and is buffered by Schmitt-Trigger logic buffer array 200 through buffers 201-203 and 201'-203' shown schematically in exploded form in FIG. 8h. The buffered feedback current comprising the states of Hall-effect sensors 173-175 is then presented to microprocessor 110 redundantly at pins 273 & 273', 274 & 274', and 275 & 275' respectively. Microprocessor 110 calculates the instantaneous rotational speed of motor shaft 22, which is a function of the instantaneous shaft angles of motor 51 digitally represented by the feedback current. Microprocessor 110 then compares the instantaneous speed of motor shaft 22 to the desired manually selected speed computed from digital representation of the potentiometer shaft 230' and determines and outputs the necessary timing and switch voltage presented to motor 51 for electronic commutation thereof to reach desired rotational speed of motor shaft 22. Resistors 131-136, 141'-146', 181-186, and 194-196 are preferably each rated 10.K-1/10 W-1%.

As motor shaft 22 is rotated about its central axis, friction ring 81 preferably rotates at the same rate as motor shaft 22. Rotation of friction ring 81, imparts a tangential force on turntable groove outer wall 84 and turntable 70 rotates about its central axis on turntable shaft 77. As turntable 70 spins, tilt assembly 20 traces an orbit about turntable shaft 77 whereby ball bearing (not shown) rotates about pivot shaft 24 which keeps threaded post 41 from rotating about its own central axis. As threaded post 41 is moved around turntable shaft 77, platform 12 follows the same orbit. The tension and compression forces placed on flexible connectors 13 change as tilt assembly 20 rotates about turntable shaft 77 which alters the degrees of straightness of flexible connectors 13 and tilt assembly 20 wobbles back and forth in turntable pivot channel 73 whereby platform 12 tilts or yaws in relation to the movement of tilt assembly 20. As the speed switch is manually selectively rotated clockwise or counter-clockwise, the degree of vertical and horizontal movement of platform 12 increases or decreases respectively.

In an alternate embodiment (not shown) microprocessor 110 is also pre-programmed with software for current overload protection of motor 51 whereby as loading of platform 12 exceeds the capabilities of motor 51 to achieve the selected speed and microprocessor 110 will continue to send more current to motor 51 to compensate, microprocessor 110 implements a fallback in power to motor 51 before trying again to send current once the pre-programmed motor current threshold is reached in an effort to prevent motor damage. Additionally, the functionality of circuit board A and circuit board B may be combined on a single board (not shown) or further distributed to additional circuit boards (not shown).

Figure 6:
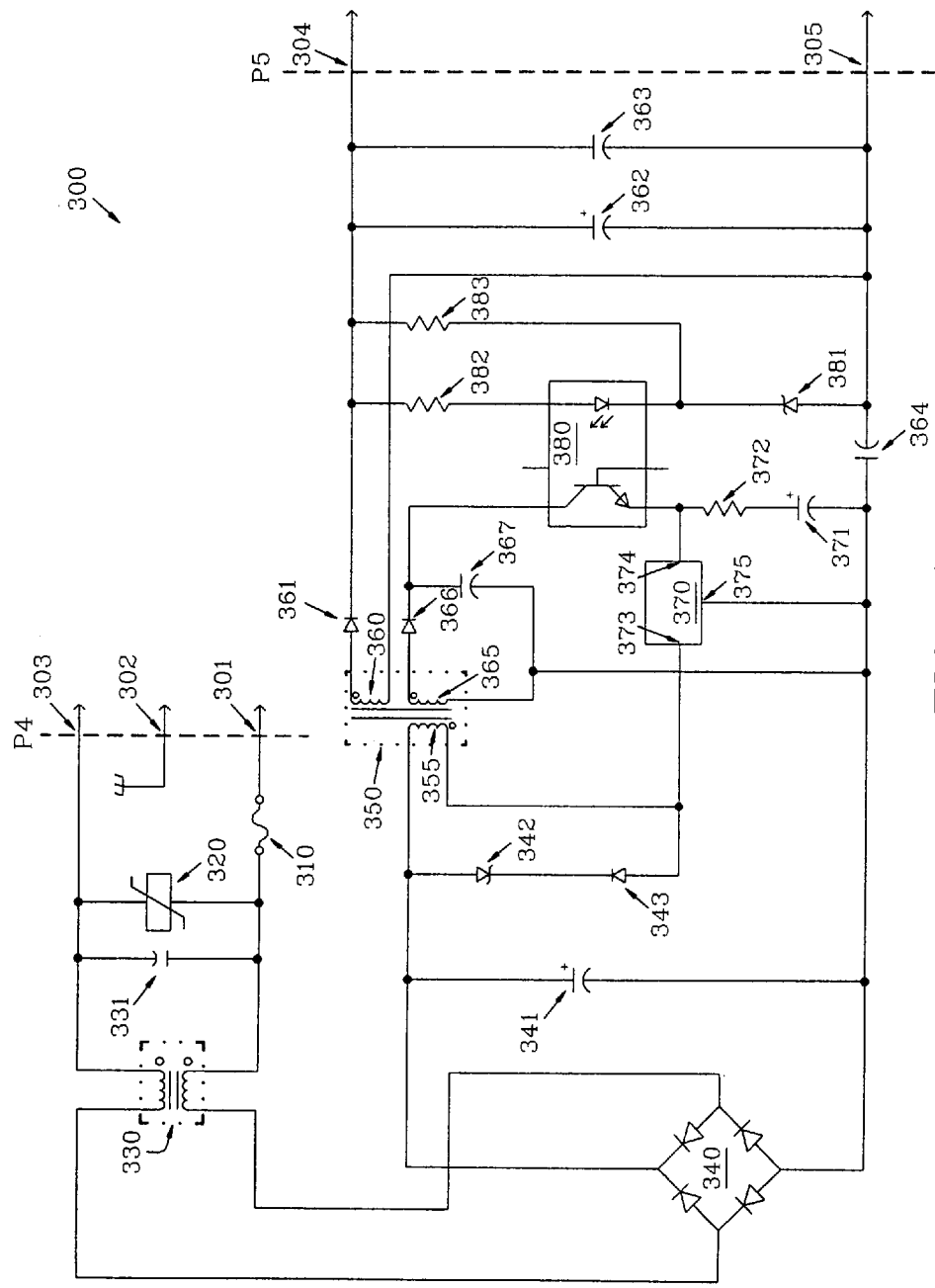
FIG. 6 depicts a circuit diagram for a line operated switch-mode power supply circuit of the drive mechanism of the mixing device.

Capacitors 341, 371, and 362 and capacitors 413, 415, and 418 are polarized and illustrated schematically with a plus-sign "+" designating the positive lead thereof in FIGS. 6 and 7 respectively.

Components set forth above and in the Figs. herein for mixing device 10 have the following model numbers and are commonly available from many manufacturers:

| COMPONENTS OF MIXING DEVICE 10 | MODEL NUMBERS |
| --- | --- |
| buffers 141-146 | ULN2003L |
| transistors 161-166 | QSIRF7319 |
| buffers 201-203 and 201'-203' | MC74HCT14AD |
| potentiometer 230 | 51AADB24A15 |
| display LED 240 | HLMP-1521 |
| transistor 242 | 2N7002 |
| metal oxide varistor 320 | V390ZA05 |
| bridge rectifier 340 | DF1506S |
| diode 342 | DF1506S |
| diodes 343, 361, and 366 | MURS160T3 |
| optocoupler 380 | H11A817AS |
| Zener diode 381 | 1SMA5926BT3 |
| standard voltage regulator 430 | USMC78L05_SO8 |

A commercially available standard assembler program (not shown) compatible with microprocessor 110 is used to convert the source code of the application specific software into machine language which microprocessor 110 can interpret, commonly referred to as "S-records" (not shown). The S-records are loaded into microprocessor 110 for programming the same with the application specific software as described herein. The source code of the application specific software for preferred mixing device 10 is contained in the computer program listing appendix submitted herewith.

The illustrations and examples provided herein are for exploratory purposes and are not intended to limit the scope of the appended claims.

We claim:

1. A method of mixing utilizing a turntable having a circumferential groove and a rotatable platform connected by a tilt assembly controlled by electrical circuitry including a microprocessor and a motor, the motor having a shaft positioned in the circumferential groove, the method comprising the steps of:
   a) supplying power to the electrical circuitry;
   b) placing a solution to be agitated on the platform;
   c) selecting a desired mixing speed;
   d) interpreting the selected mixing speed by the microprocessor;
   e) turning the motor shaft while the motor shaft engages the circumferential groove to rotate the turntable; and
   f) rotating the tilt assembly with the turntable to mix the solution.

2. The method of claim 1 wherein rotating the tilt assembly further comprises the step of orbiting the platform.

3. The method of claim 1 wherein supplying power to the electrical circuitry further comprises the step of supplying A.C. power.

4. The method of claim 1 wherein placing a solution to be agitated further comprises the step of placing a biological solution on the platform.

5. The method of claim 1 wherein selecting a mixing speed further comprises the step of managing the motor speed through using a motor controlled circuit board.

6. The method of claim 1 wherein interpreting the selected mixing speed further comprises the step of directing an electronic communication to the motor.

7. The method of claim 1 wherein rotating the tilt assembly further comprises the step of agitating the solution by vertical and horizontal movements of the platform.

8. A method of mixing a biological or chemical solution utilizing a turntable defining a circumferential groove, a tilt assembly and a rotatable platform controlled by electrical circuitry having a preprogrammed microprocessor and a motor with a shaft positioned in the circumferential groove, comprising the steps of:
   a) supplying power to the electrical circuitry to drive the microprocessor to exceed a selective voltage;
   b) rotating the motor shaft;
   c) exerting a force from the motor shaft to the turntable groove; and
   d) orbiting the platform to thereby mix a solution placed thereon.

9. The method of claim 8 wherein exerting a force further comprises the step of exerting a friction force from the motor shaft to the turntable.

10. The method of claim 8 wherein orbiting the platform further comprises the step of driving a tilt assembly attached to the turntable.

11. The method of claim 10 wherein driving the tilt assembly comprises the step of tilting the platform for both horizontal and vertical agitation to the solution.

\* \* \* \* \*